United States Patent [19]

Sink et al.

[11] Patent Number: 4,947,654
[45] Date of Patent: Aug. 14, 1990

[54] LIQUID CRYOGEN FREEZER WITH IMPROVED VAPOR BALANCE CONTROL

[75] Inventors: Brian Evan Sink, Orland Park; Gary D. Lang, Naperville; Benjamin Zyer, Orland Park, all of Ill.

[73] Assignee: Liquid Carbonic Corporation, Chicago, Ill.

[21] Appl. No.: 444,015

[22] Filed: Nov. 30, 1989

[51] Int. Cl.$^5$ .............................................. F25D 17/04
[52] U.S. Cl. .................................. 62/186; 62/266; 62/374; 62/380; 62/381
[58] Field of Search .................. 62/186, 266, 374, 381

[56] References Cited

U.S. PATENT DOCUMENTS

| | | | |
|---|---|---|---|
| 3,255,608 | 6/1966 | MacIntosh | 62/374 |
| 3,404,989 | 10/1968 | Hirtensteiner | 99/193 |
| 3,485,055 | 12/1969 | Webster et al. | 62/63 |
| 3,553,973 | 1/1971 | Moran | 62/63 |
| 3,728,869 | 4/1973 | Schmidt | 62/266 |
| 3,824,806 | 7/1974 | Wagner | 62/380 |
| 3,916,640 | 11/1975 | Rasovich | 62/266 |
| 4,086,783 | 5/1978 | Wagner et al. | 62/374 |
| 4,086,784 | 5/1978 | Wagner | 62/374 |
| 4,090,369 | 5/1978 | LeDiouron | 62/380 |
| 4,237,695 | 12/1980 | Oberpriller et al. | 62/63 |
| 4,276,753 | 7/1981 | Sandberg et al. | 62/380 |
| 4,350,027 | 9/1982 | Tyree, Jr. | 62/374 |
| 4,386,504 | 6/1983 | Brautigam | 62/380 |
| 4,403,479 | 9/1983 | Rasovich | 62/63 |
| 4,475,351 | 10/1984 | Klee | 62/63 |
| 4,528,819 | 7/1985 | Klee | 62/63 |
| 4,589,264 | 5/1986 | Astrom | 62/374 |
| 4,627,244 | 12/1986 | Willhoft | 62/380 |
| 4,739,623 | 4/1988 | Tyree, Jr. et al. | 62/63 |
| 4,745,762 | 5/1988 | Taylor | 62/374 |
| 4,783,972 | 11/1988 | Tyree, Jr. et al. | 62/374 |
| 4,800,728 | 1/1989 | Klee | 62/380 |
| 4,866,946 | 9/1989 | Klee | 62/63 |

*Primary Examiner*—Ronald C. Capossela
*Attorney, Agent, or Firm*—Fitch, Even, Tabin & Flannery

[57] ABSTRACT

A cryogenic freezer apparatus for food products includes a conveyor within a thermally insulated enclosure. A cryogen injecting unit is located in said enclosure adjacent the opening thereof, and responsive to a cryogen control signal for introducing liquid cryogen in said enclosure. A blower unit in said enclosure directs cryogen vapor away from said enclosure opening toward the interior of said enclosure. The output of said blower unit being controllable by a blower control signal. A sensing unit within said enclosure senses the cooling capacity of the cryogen vapor at the enclosure opening and generates a sensor output signal which is indicative of the amount of cryogen vapor escaping out of said opening. A control unit, coupled to said sensing unit, said injecting unit, and to said blower unit generates a cryogen control signal and a blower control signal in response to the sensor output signal. Cryogen vapor escaping from the enclosure is limited to an amount needed to maintain an air lock, thus preventing air intrusion into the enclosure.

12 Claims, 4 Drawing Sheets

LIQUID CRYOGEN FREEZER WITH IMPROVED VAPOR BALANCE CONTROL

BACKGROUND OF THE INVENTION

The invention pertains to cryogenic freezing apparatus, and more particularly to such apparatus using a liquid cryogen, such as nitrogen, for cooling articles within a freezer apparatus. The present invention is particularly directed to a freezer apparatus which operates on a continuous stream of articles as opposed to such apparatus operating in a batch mode.

Various types of cryogenic cooling apparatus are known, and in general do a satisfactory job of cooling or freezing various articles. Two popular types of cryogenic apparatus in use today are commonly known as "spiral freezers" and "tunnel freezers". Both of these types of apparatus operate in a continuous mode, where articles such as foodstuffs or the like are continuously fed through the freezer apparatus with the stream of articles leaving the cooling apparatus being cooled or frozen, as desired. A cryogen immersion bath may be provided at the entrance end of the tunnel or spiral freezer, and if so, the freezer is commonly termed a "cryogen immersion freezer."

One particularly popular type of such freezer apparatus in use today employs a liquid cryogen such as nitrogen in which the articles are either fully or partly immersed or, alternatively the liquid cryogen is allowed to vaporize thereby cooling the interior of the freezing chamber. Early designs of such freezer apparatus, known as "isothermal" freezers, operate at one low temperature throughout the cooling or freezing chamber. Commonly assigned U.S. Pat. No. 4,739,623 offered significant improvements to such freezers, greatly increasing the efficiency thereof by controlling the escape of cryogen vapors created in the freezer which, after being made to circulate through the interior of the freezing chamber, are allowed to escape through the warmest portions thereof. In the U.S. Pat. No. 4,739,623 a spiral conveyor is provided and a fan at the freezer entrance directs air toward the "stack" of coils of the spiral conveyor. Also employed in the freezing chamber are several circulating blowers to maintain desired cooling in various portions of the freezing chamber. One such blower is mounted adjacent the inlet to the freezing chamber and is controlled in response to temperature sensed at an exhaust duct. Ambient air surrounding the freezing chamber is channeled through the exhaust duct, and if the temperature thereof should rise in an undesirable manner, the blower adjacent the freezer inlet is decreased in speed to permit cold cryogen to escape through the entrance to the freezing chamber thereby blocking infiltration of the ambient air into the freezing chamber. Conversely, if the temperature in the exhaust duct should decrease more than a desirable amount, fan speed adjacent the freezer inlet is increased to blow more cold cryogen vapor toward the path through which the articles travel during freezing.

Commonly assigned U.S. Pat. Nos. 4,350,027 and 4,783,972 disclose tunnel-type cooling apparatus. Both apparatus use liquid cryogen cooling media and both have a series of blowers internal to the tunnel for facilitating cooling. U.S. Pat. No. 4,783,972 discloses a baffle and damper arrangement which is adjusted by a control motor in accordance with the temperature of vapor leaving an upwardly directed chimney or venting duct. If an elevated temperature is sensed, for example, the baffle and damper arrangement is adjusted to direct additional cryogen vapor toward the entrance end of the tunnel. The temperature sensed at the outlet of the duct is that of a mixture of cryogen vapor and ambient air which has infiltrated the entrance area. Thus, the temperature reading at the exit end of the duct is an indirect measurement of the condition at the entrance. While this arrangement has met with considerable commercial success, a more direct i.e., more tightly coupled control is desirable to further increase the efficiency of operation.

U.S. Pat. No. 4,276,753 provides another example of liquid cryogen freezing in a tunnel freezer. A conveyor belt is oriented in a generally straight line and passes through a tunnel enclosure within which liquid cryogen is dispersed by injection lines, and circulated with a sequence of blower fans. A directional blower is located in the tunnel remote from the entrance end and circulates cryogen vapor in a counter direction, opposite that of the travel of the conveyor, and the articles carried thereon. An exhaust blower is located at the top of a chimney or exhaust stack located above the entrance to the tunnel. A temperature sensor is mounted adjacent the downstream end of the tunnel and drives a control for the exhaust blower and the directional blower. When temperature adjacent the exit end of the tunnel increases above a preset level, the input of liquefied cryogen in the tunnel is increased and the operating speeds of the directional blower and exhaust blower are increased. Conversely, when the temperature sensed in the tunnel adjacent the exit end thereof falls below a lower preset, less liquefied cryogen is introduced into the tunnel and the operating speeds of the directional blower and exhaust blower are decreased. Thus, the exhaust blower located adjacent the entrance end of the tunnel is controlled by temperature sensed adjacent the exit end of the tunnel, fan speed being increased to prevent unacceptably high amounts of infiltration of ambient air into the freezing tunnel.

U.S. Pat. No. 4,403,479 discloses another example of a liquid cryogen freezing apparatus, comprising an upstream immersion bath for articles to be frozen, and a downstream freezing tunnel to complete the freezing or cooling process. An exhaust chimney or duct is provided at the outlet of the tunnel to draw cryogenic vapor from the immersion bath through the tunnel for further cooling of the articles, subsequent to the initial immersion. An amount of the liquid cryogen used in the immersion bath is allowed to spill, to create a cryogen vapor pressure, preventing infiltration of ambient air into the entrance of the cooling apparatus. The tunnel is operated without re-circulating fans and without vapor spray inlets. An exhaust fan adjacent the exit end of the tunnel and baffles within the tunnel are, however, employed.

Despite the advances discussed above, further improvements to liquid cryogen cooling apparatus are still being sought. For example, a significant improvement in efficiency of operation of a cooling apparatus can be obtained if vapor balance at the entrance to the freezing apparatus, where articles to be frozen are introduced, can be more closely controlled.

Other advances are being sought to provide a retrofit enhancement to existing mechanical cooling systems which are no longer adequate to handle increased product throughput. A liquid cryogen cooling tunnel could be employed at the entrance to the mechanical cooling system, but economies of operation dictate that the efficiency of the added cryogen system be sufficiently efficient to justify the added capital investment. Accordingly, liquid cryogen tunnel freezers of compact size add capable of economical efficient operation are being sought for such applications.

SUMMARY OF THE INVENTION

It is an object according to the present invention to provide an improved control over vapor balance at the entrance end of liquid cryogenic freezing or cooling apparatus.

A further object according to the present invention is to provide a vapor balance control for such apparatus by measuring one or more operating parameters adjacent the entrance to the apparatus, rather than at some point remote therefrom.

A further object according to the present invention is to provide vapor balance controls which can be used on virtually any type of liquid cryogen freezing apparatus, including spiral freezers and tunnel freezers in popular use today, and for such freezers using cryogenic immersion or cryogenic spray to augment the freezing or cooling process.

These and other objects according to the present invention which will become apparent from studying the appended description and drawings are provided in a cryogenic freezer apparatus for food products, comprising:

a thermally insulated enclosure having an entrance opening and an exit opening;

conveyor means for conveying products through said enclosure, from said entrance to said exit openings;

cryogen injecting means in said enclosure, responsive to a cryogen control signal for introducing liquid cryogen in said enclosure, with cryogen vapor being produced thereby;

blower means in said enclosure to direct cryogen vapor away from said enclosure opening, the output of said blower means being controllable by a blower control signal;

injection control means coupled to said injecting means, for generating a cryogen control signal;

blower control means coupled to said blower means to control the output thereof in response to a blower control signal; and coupling means coupled to said cryogen control signal and to said blower control means for providing a blower control signal responsive to said cryogen control signal, so that output of the blower means is increased with increasing cryogen injection to limit the outflow of cryogen vapor passing through said enclosure opening to a preselected amount needed to prevent intrusion of the ambient environment through the enclosure opening, despite increasing cryogen vapor pressure in said enclosure, and so that output of the blower means is decreased with decreasing cryogen injection to ensure that the preselected cryogen outflow is maintained at said opening to prevent intrusion of the ambient environment therethrough.

Other objects of the present invention are attained in freezer apparatus of the above type wherein the sensing means comprises temperature sensors and/or pressure sensors which sense the injection pressure of the cryogen.

The present invention is adapted for use with the different types of freezer apparatus in operation today, including spiral conveyor freezers, and tunnel freezers having either spray injection or an immersion bath at the entrance portions thereof.

BRIEF DESCRIPTION OF THE DRAWINGS

In the drawings, wherein like elements are referenced alike.

DETAILED DESCRIPTION OF THE PREFERRED EMBODIMENT

Figure 1:
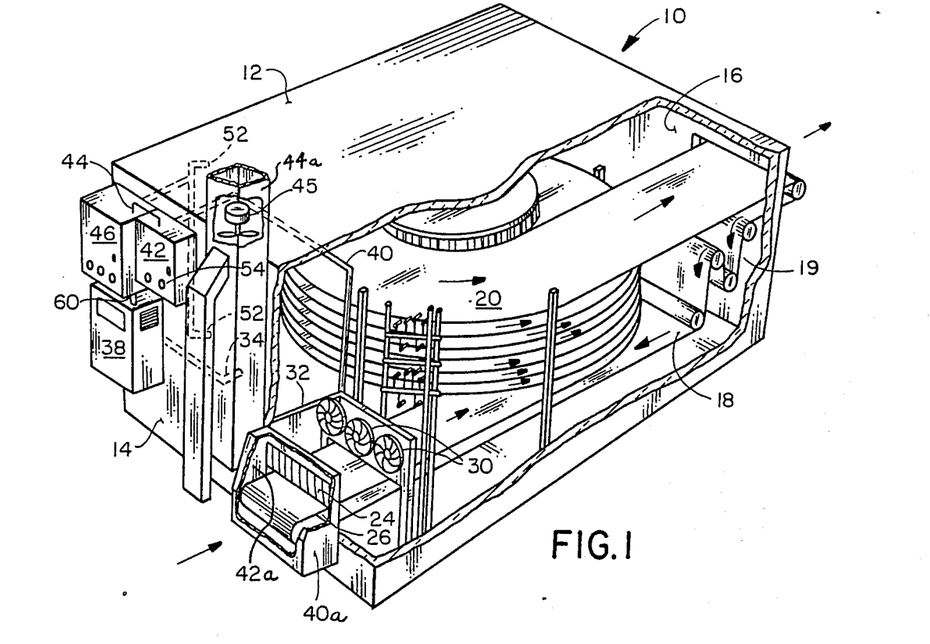
FIG. 1 is a perspective view of a spiral freezing apparatus illustrating principles according to the present invention.

Referring now to the drawings, and initially to FIG. 1, a liquid cryogen freezer apparatus according to principles of the present invention is illustrated in FIG. 1, the freezer apparatus being generally indicated at 10. Apparatus 10 includes an enclosure 12 that is formed with thermally insulated side, top and bottom walls and has an entrance end 14 and an exit end 16. An endless spiral conveyor 18 carries products to be cooled or frozen through the freezer. The spiral conveyor 18 is of a type described in commonly assigned U.S. Pat. No. 4,739,623, which is incorporated by reference as if fully set forth herein. The ends of the conveyor 18 of FIG. 1 are coupled through a customary return loop 19. Conveyor 18 includes a central portion 20 comprising a stack of coils, or windings of the conveyor where freezing of the products and thermal equilibration, begun at the entrance end 14, is completed. Conveyor 18 passes through an entrance 24 in the enclosure wall 26.

As will be seen herein, cryogen liquid is vaporized in the enclosure, the vapor providing a cooling or freezing of the product. With the present invention, a balance of the cryogen vapor with ambient air pressure is maintained such that the partial pressure of the cryogen gas within the enclosure is slightly higher than the surrounding air pressure, to thereby form an "air lock" preventing infiltration of ambient air within the freezer. An optimum pressure difference blocks air infiltration with a minimal outflow of cryogen vapor through entrance 24. If this minimum pressure differential is exceeded, cryogen vapor expelled from entrance 24 will not be available to perform cooling of the products passed through the freezer. The following describes vapor balance control of the entrance openings of various freezer systems. Those skilled in the art will readily appreciate that principles of the present invention can also be applied to exit openings of freezer enclosures, or virtually any opening, for that matter.

As explained in U.S. Pat. No. 4,739,623, an injection control system is provided, being driven by a temperature sensor located in enclosure 12. The injection control system sends a cryogen control signal to cryogen injection apparatus, typically a control valve, to control the amount of cryogen entering the freezer. As will be seen, in one preferred embodiment of the present invention, the cryogen control signal is employed as an input to a vapor balance control system. In another preferred embodiment the pressure of the cryogen injection apparatus is monitored to provide vapor balance control.

Figure 2:
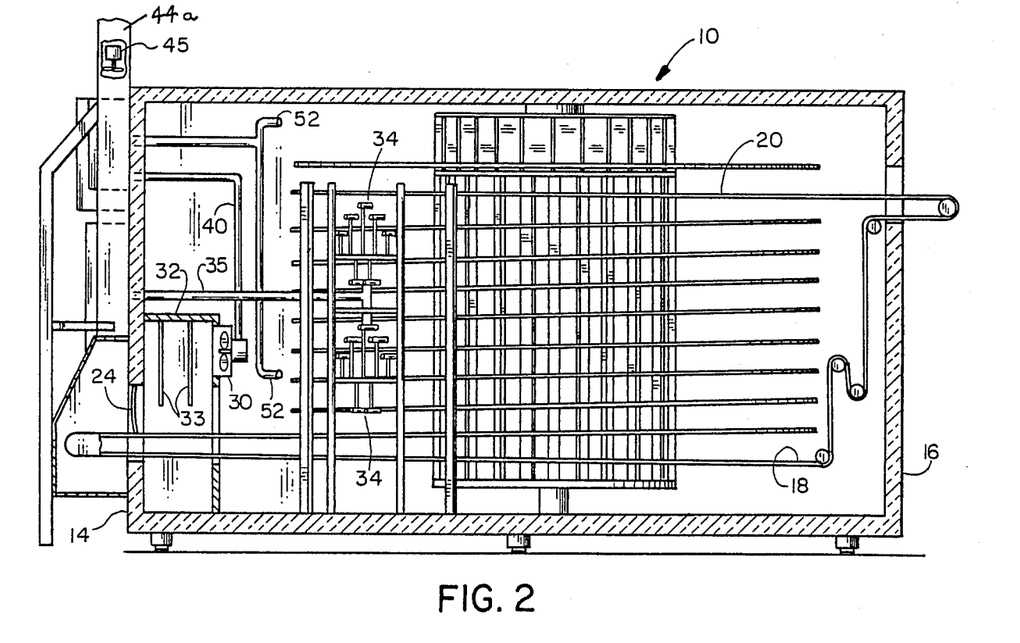
FIG. 2 is a side-elevational view of the apparatus of FIG. 1.

Turning to FIGS. 1 and 2, freezer 10 includes a baffle box 32 disposed adjacent entrance 24. A plurality of blowers 30 are installed in box 32, scavenging cryogen vapor passing outwardly through box 32, redirecting the vapor into enclosure 12. Baffle plates 33 are installed in box 32 to impede cryogen outflow, out of enclosure 12. Cryogen injectors 34 are fed by a source of cryogen (not shown) through a manifold and an injection control apparatus 38, constructed according to U.S. Pat. No. 4,739,623.

Figure 3:
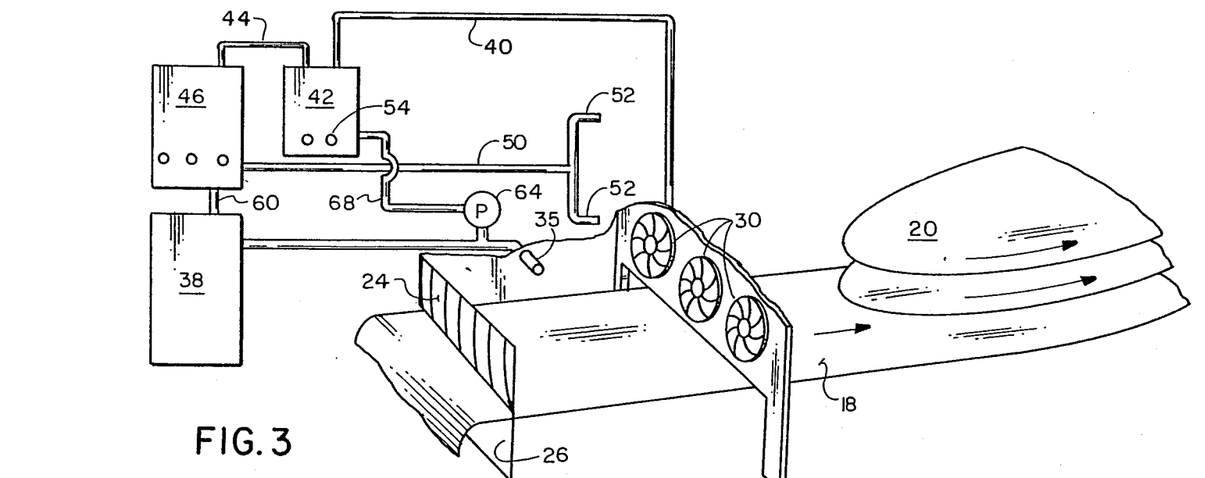
FIG. 3 is a fragmentary view of a portion of the freezer apparatus of FIGS. 1 and 2, illustrating the automatic vapor balance control system which is used to control the flow of cryogenic vapor within the freezer apparatus.

The blowers 30 are connected through an electrical circuit 40 to a blower control unit 42. According to one aspect of the present invention, the blower fans 30 are of a variable speed type, their output being varied by the electrical signals along circuit 40. The blower speed control unit 42 provides the energization for, and controls the speed of blower fans 30 by generating the appropriate electrical signals in circuit 40. According to one aspect of the present invention, the blower fan speed control unit 42 energizes blower fans 30 and controls the speed thereof in response to the cryogen injection signal, which is carried along conductor 60. Electronic controller 46 further includes a gain control module having a temperature set point adjustment knob 54 for inputting a set point temperature, used in a manner which will now be described. The blower fans 30 may also have single speed or multiple speed windings, and the control unit will thus comprise only the gain control module.

In this first embodiment, the electronic controller 46 responds to signals fed therein from temperature sensors 52 which are located adjacent the entrance wall of enclosure 12. It should be mentioned that FIG. 3 illustrates a schematic representation of a physical freezing system. As such, the cryogen lines, temperature sensors and blower fans are shown exploded for ease of visual reference. In a practical embodiment, the cryogen lines, temperature sensors and blower fans are located close to one another.

Temperature sensors 52 continuously monitor the cooling capacity of the cryogen vapor in the enclosure and either sends a signal along circuit 50 or can be polled by electronic controller 46. In either event, the electronic controller 46 is continuously provided with updated sensor output information directly related to the cooling capacity of the cryogen vapor within the enclosure and indirectly related to the amount of cryogen vapor escaping out of the entrance to the enclosure.

According to one aspect of the present invention, the controller 46 is provided with one or more set point adjustments 54 indicating the levels of operating temperatures which the controller seeks to maintain. For example, assuming the temperature indicated by sensor 52 begins to rise, the temperature is compared against a lower set point value. Once the set point value is exceeded, the electronic controller is programmed to make decisions and take action which will lower the temperature at the enclosure entrance. For example, the electronic controller may set a timing circuit, or may light an indicator lamp indicating the over temperature condition.

Preferably, the electronic controller 46 is programmed to supply control signals on circuit 50, instructing the cryogen injection control apparatus 38 to release cryogen to manifold 35 or to increase the pressure in the supply line feeding the manifold. If desired, a pressure sensor 64 can be provided to indicate to the electronic controller through circuit 68, that the proper amount of cryogen is released to the enclosure entrance. In the first embodiment, however the pressure sensor 64 has been found to be unnecessary, since the increased injection of cryogen from injectors 34 is directly sensed by the temperature sensor 52 located proximate thereto.

According to an important aspect of the present invention, the demand for additional cryogen injection ordered by electronic controller 46 is simultaneously accompanied by control signals issued by the electronic controller on circuit 44 to drive the fan controller 42 in a manner which produces an increased output or fan capacity of blower fans 30. According to one aspect of the present invention, if the injection rate of cryogen exceeds a preset level, a continued demand for cryogen injection is accompanied by a concurrent signal to the fan controller in the manner which insures that fan output, e.g. fan speed, will increase when the cryogen injection is increased.

As will be readily appreciated by those skilled in the art, the control signals to fan controller 42 issued by the electronic controller can bear a variety of mathematical relationships to the signals on circuit 60 which are issued by the electronic controller to drive the cryogen injection unit 38. For example, fan output (e.g. speed) and cryogen injection pressure can be linearly related in electronic controller 46. In the preferred embodiment, the signals on conductor 44 are the same as those on conductor 60, that is, the speed control unit is driven by the cryogen injection signal. Thus, many conventional freezer units need be provided only with a control unit 42, and a second process controller is not required. As mentioned above, the control unit will include a variable speed control circuit having a gain control stage, or may alternatively comprise the gain control module and relay logic, and thus a significant savings is made possible with the present invention.

Assuming that the temperature sensor 52 indicates an over temperature condition, passing the lower threshold set in electronic controller 46, injection of cryogen continues at injectors 34 thus cooling the ambient temperature at entrance 24. Eventually, with sufficient cryogen injection the temperature at the entrance 24 is lowered sufficiently, being directly detected by temperature sensor 52 which relays this information through conductors 50 to electronic controller 46. The presence of sufficient cooling can be readily determined by inputting a second temperature set point in the electronic controller and by initiating certain decisions and taking certain actions when the second, higher temperature set point is attained. For example, the electronic controller 46 can be programmed to simply discontinue injection at injectors 34 by so instructing the injection controller 38. Also, if desired, the electronic controller can be programmed to "ramp down" the cryogen injection at injectors 34 with the temperature sensor 52 being continuously monitored to determine the rate of heat influx, thereby preventing rapid cycling of the control system.

As will be appreciated by those skilled in the art, the electronic controller can calculate substitute set point temperatures based upon a calculated rate of heat influx. Again, according to an important aspect of the present invention, the fan speed of blower fans 30 is made to follow the change in injection by injection controller 38, the blower fans and cryogen injection control both being controlled by circuitry in electronic controller 46. As has been pointed out, an important feature of the present invention is the control of electronic controller 46 over both the blower fan output and the cryogen injection rate, in response to the same input signal, herein the signal from temperature sensor 52. Thus, if the cryogen injection is "ramped down" the electronic controller 46 also "ramps down" the blower fan output, matching the blower fan output to the cryogen injection rate according to a predetermined patterned stored in the circuitry of electronic controller 46.

According to another aspect of the present invention, the fan control unit is provided with a gain control module, such as that available from Wilkerson Instrument Co. Inc. of Lakeland Florida, under the name MIGHTY MODULE. The gain control module includes a differential amplifier which measures either a DC input voltage, or with a shunt resistor measures a current input. The preferred gain control module provides a DC output proportional to a DC input signal while providing wide ranging zero and span adjustments that allow the unit to accommodate a wide range of signal levels and offsets.

The gain control module provides an adjustment for the freezer operator to quickly and easily initialize the desired freezer operation. For example, when the cryogen input is established for a given product loading through the freezer, the gain control module can be adjusted to provide the desired outflow of cryogen vapor, necessary to establish an air lock at the freezer entrance. Once the gain control module is initialized, blower output is thereafter automatically controlled in response to the input to control unit 42.

The controller 46 of the preferred embodiment generates a varying 4–20 milliamp output signal on conductors 60 and 44. In addition to the gain control module portion, the fan control unit 42 of this preferred embodiment generates an alternating current speed controller signal in response thereto, which ranges in frequency from 0 to 60 Hertz. As will be seen herein, simpler and less costly fan control units can be constructed with a gain control module and relay logic. However, even the relatively more costly fan control unit of this preferred embodiment is considerably less expensive than a process controller, such as that typically used in temperature sensor-driven systems.

As mentioned, the blowers 30 need not have variable speed capability, but can rather include either single or multiple speed windings. Assuming the blowers have multiple speed windings, the fan control unit 42 includes (in addition to the gain control module) relay logic of either the mechanical or electronic type which energize selected windings of the blower motors along separate conductors 40. Alternatively, if blower motors 30 have only a single speed winding, blower output is controlled by unit 42, by "staging" the blowers, energizing either 1, 2 or 3 blowers to attain the desired blower output. As will be appreciated by those skilled in the art, the most economical control unit is obtained with fan control units employing relay logic, those used in combination with blower motors having either single or multiple speed windings.

Thus, as before, operation of the electronic controller 46 controlling the cryogen injection and operation of the blower fan are related to one another, that is they "follow" one another in response to a common input signal.

In a second embodiment of a freezer system having an improved vapor balance control, a pressure sensor 64 is employed to monitor cryogen input to the freezer. As those familiar with the freezing art are aware, the pressure of liquid cryogen at the supply to cryogen injectors 34 provides a direct indication of the temperature drop at cryogen injectors 34, and hence at the enclosure entrance 24. Thus, the cooling capacity of the cryogen vapor within the enclosure, adjacent the entrance thereof, is indicated. An increased pressure sensed by unit 64 is relayed through circuitry 68 to fan control unit 42. As in the first embodiment, the present invention causes the blower output to follow the increased cooling input to the freezer unit. Thus, with increasing pressure supplied to cryogen injectors 34, the output (e.g. speed) of blower fans 30 is increased by sending appropriate control signals through conductors 40 to blowers 30.

It is contemplated that, in many applications, pressure must be continuously applied to cryogen injectors 34 during operation of the freezer unit. Thus, the pressure sensor 64 will send a continuous signal to fan control unit 42, which in turn will send a continuous control signal to a variable speed blower 30. As the pressure at the cryogen supply is decreased, a decreasing pressure signal is sent by sensor 64 to circuit 60 to fan control unit 42. The fan controller 42 thereupon reduces the air speed exhausted from blower fans 30.

As can be seen from the above, when cryogen injection is increased as dictated by circuitry to attain desired operating conditions within the freezer unit, the output of blower fans 30 is automatically and correspondingly increased, thereby increasing the vacuum or suction at the freezer entrance 24. As will be appreciated by those skilled in the art, the amount of increased suction at the freezer entrance 24 can be accurately controlled so as to prevent excessive outflow or purge of cryogen vapor through entrance 24. The fan output of blower fans 30 can be easily controlled with the gain control module so as not to "overpower" cryogen vapor pressures at entrance 24 to a point where those pressures fall below the ambient air pressure at the freezer entrance, thus insuring that a cryogen vapor purge or air-lock at the freezer entrance will be provided at all times.

By increasing the blower fan output along with increased cryogen injection, the most efficient utilization of the added cryogen vapor is attained, by directing that vapor toward the coil stack and the conveyor belt 18 where useful work is done in cooling or freezing products to be processed by the freezer system. As the freezer enclosure cools down to a desirable temperature, the pressure in the cryogen injection injectors 34 is reduced and accordingly the blower fan output is also reduced to prevent the intrusion of ambient air through entrance 24.

Those skilled in the art will also readily appreciate that electronic controller 46 can closely monitor the rate of temperature drop during a cryogen injection cycle, to determine if the air lock at entrance 24 is insufficient, with ambient air being entrained into the mixture flowing past temperature sensor 52. If such a condition is detected, the fan control unit can issue control signals to cut back fan output, while concurrently monitoring the effect on the temperature experienced at sensor 52. Depending upon the results, the blower fan output set points can be reset automatically by the control unit, or the data can be recorded for later analysis by an operator, or an indicator lamp can be energized indicating the undesirable condition.

The control system according to the present invention has been found to provide the flexibility necessary to offer efficient cryogen usage in a variety of applications, such as the spiral freezer illustrated in FIGS. 1–3. As will be seen herein, the same control system is also readily adaptable for use with the two tunnel freezer systems of FIGS. 4–6, operated as a stand-alone freezing unit, and a tunnel freezer illustrated in FIG. 7 providing an initial cooling at the entrance to a mechanical freezing unit.

Figure 4:
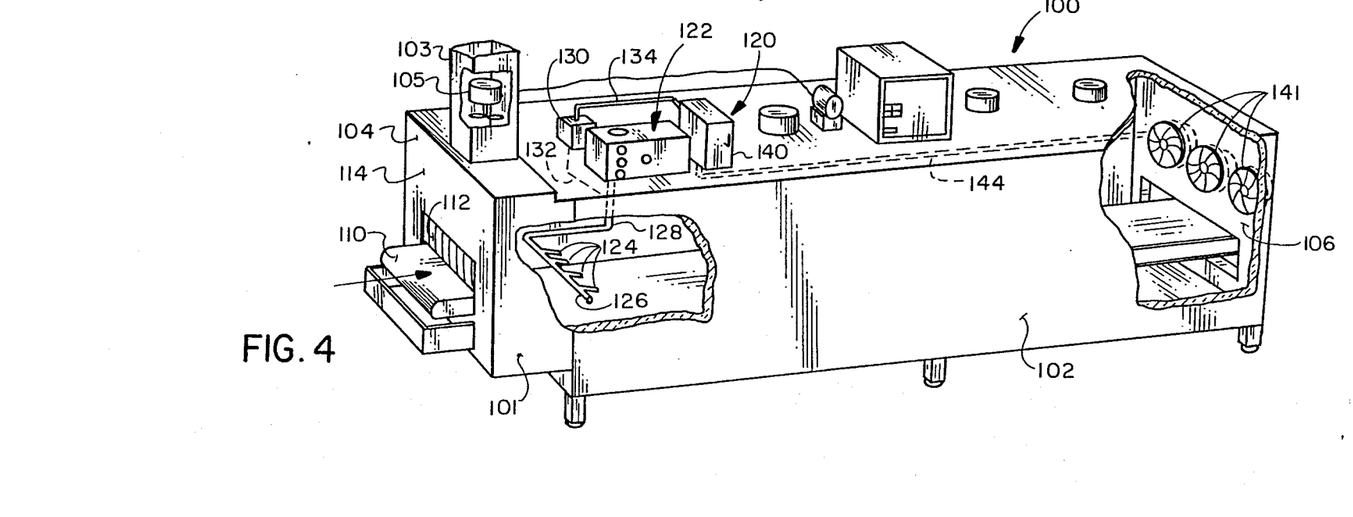
FIG. 4 is a perspective view of another freezing apparatus according to the present invention having a freezing tunnel through which products are transported for freezing.
Figures 5, 6:
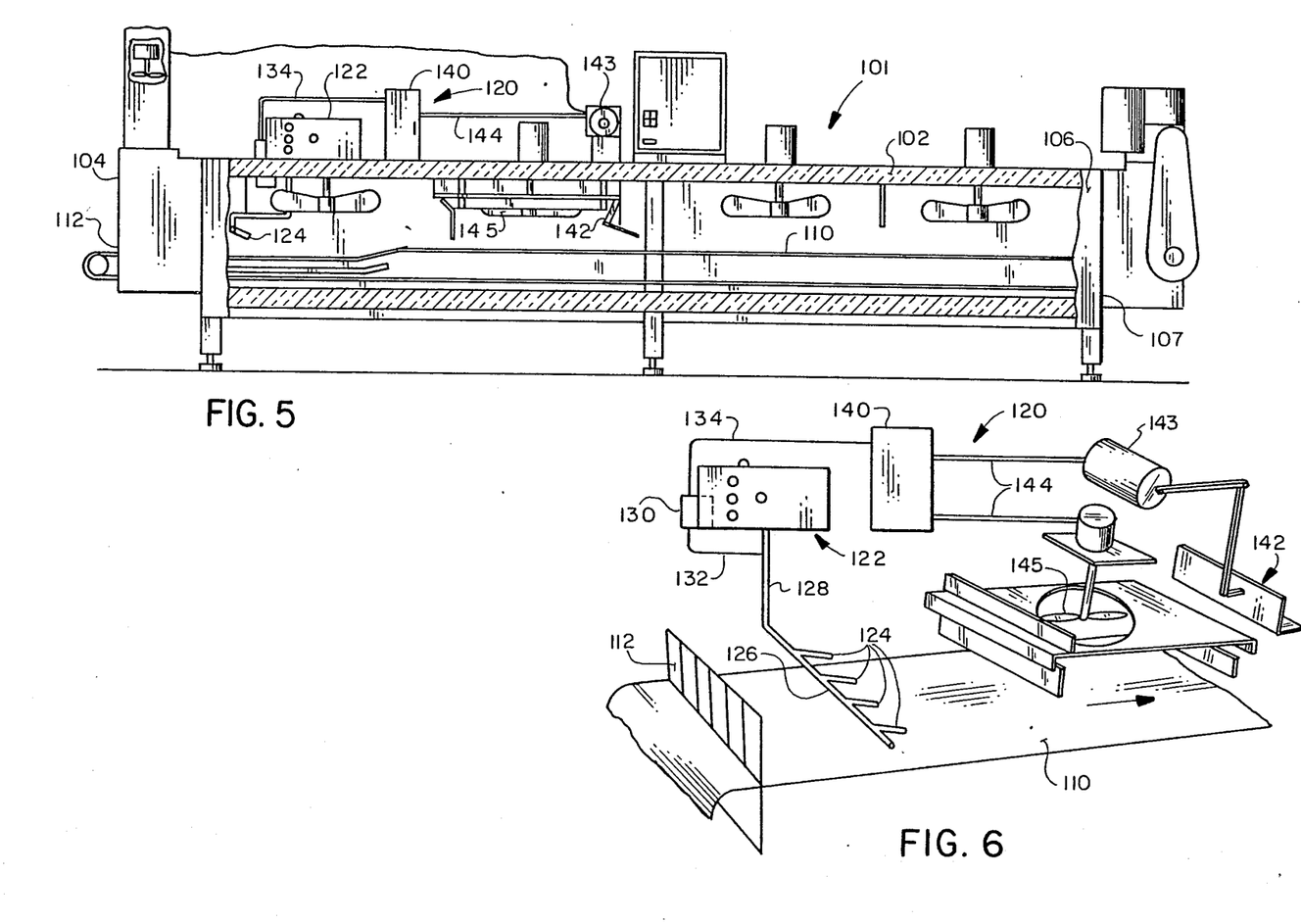
FIG. 5 is a cross-sectional elevational view of the apparatus of FIG. 4.
FIG. 6 is a fragmentary view of a portion of the freezer apparatus of FIGS. 4 and 5 specifically illustrating its automatic vapor balance control system which is used to control the flow of cryogenic vapor within the tunnel enclosure.

Attention will now be turned to FIG. 4 showing a tunnel freezer generally indicated at 100, including a tunnel enclosure 102 having an entrance end 104 and an exit end 106. As will be seen herein, FIGS. 5–6 show a similar freezer 101. The freezers 100, 101 differ in the style and location of the vapor balance control blowers employed. The exit end 106 of the freezer enclosure is provided with a mating surface 107 suitable for connection to another, downstream freezer apparatus. For example, the freezer 100 can provide augmented cooling capacity for a downstream mechanical freezer, such as one using ammonia or FREON.

An endless conveyor belt 110 projects through an entrance opening 112 in the entrance enclosure wall 114. The tunnel freezer system 100 is preferably constructed in a manner similar to the apparatus disclosed in commonly assigned United States Patent No. 4,350,027 which is incorporated by reference as if fully set forth herein.

The operation of tunnel freezer 100 is controlled by an automatic control system generally indicated at 120. The control system 120 includes an injection control unit 122 for controlling the injection of cryogen at lines 124 supplied by a manifold 126. A conduit 128 supplies cryogen to manifold 126. The control system 120 further includes a pressure sensor 130 coupled to conduit 128 through a line 132. Pressure sensor 130 samples the pressure at conduit 128 providing an output signal on circuit 134 indicative of the sensed pressure. The pressure indicating data signal is fed by circuit 134 to a fan control unit 140. The fan control unit in turn generates signals to blower fans 141 through circuit 144. When variable speed blowers are employed, the blower fan control unit 140 includes an electronic control circuit which produces blower fan signals on circuit 144 proportional to or otherwise related to the pressure input signal carried on conductors 134.

It is expected, in many applications, that cryogen will be continuously injected at lines 124 to maintain the interior of tunnel freezer unit 100 at a proper operating temperature. Thus, a pressure signal will be continuously produced on circuit 134, and a continuous input to fan control unit 140 will also be provided. Assuming, for example, that the injection control unit 122 orders an increase in cryogen injection, the increased pressure will be immediately sensed at pressure sensor 130 and a corresponding signal will be sent along circuit 134 to fan control unit 40. The circuitry in fan control unit 140 operates such that the fan output of blower fans 141 is increased as the injection pressure applied to cryogen lines 124 is increased.

Conversely, the fan output is decreased as the cryogen pressure is decreased When injection control unit 122 senses the need for increased cooling, cryogen pressure at cryogen lines 124 is increased. Blowers 141 are also pointed in a downstream direction to aid in drawing cryogen vapor through the tunnel enclosure 102 where useful work is performed on products being processed by the freezer unit 100 and on a downstream freezer mated therewith. The arrangement of FIG. 4 is preferred for such so-called combination freezer systems, where the freezer 100 is added to an existing freezer system to augment the cooling capacity thereof. The blowers 141, located at the transition wall or downstream end of the enclosure assure a pressure balance at the freezer outlet, preventing an external atmosphere from entering the enclosure.

As cryogen pressure is decreased at lines 124, the fan output of blower fans 141 is accordingly decreased to insure that the partial pressure of cryogen vapor at entrance 112 exceeds the ambient air pressure, thereby maintaining an air-lock at the enclosure entrance. As with the systems described above with reference to FIGS. 1–3, the control system 100, provides an accurate control of the partial pressure of the cryogen vapor at enclosure entrance 112, despite fluctuations in the injection pressure. If desired, the fan control unit can be driven by the cryogen injection signal which regulated cryogen injection, rather than a signal from a pressure sensor. Both modes of driving the fan control unit, however, are related to the changing rates of cryogen injection.

Turning now to FIGS. 5 and 6, a tunnel freezer 101 is substantially identical to the aforedescribed freezer 100, except for the design and location of the blowers used in the vapor balance control system. More particularly, the blowers 141 located at the downstream transition wall of the freezer enclosure are replaced by a baffled blower system of the type described in U.S. Pat. No. 4,783,972 which is hereby incorporated by reference as if fully set forth herein. As described in the United States Patent, the baffled blower system includes a control motor 143 which displaces a system of upstream and downstream damper plates through a series of linkages and crank arms. For example, as illustrated in FIG. 5, the lower or inferior upstream damper plate is shown in a closed position, whereas the inferior downstream damper plate is moved to an open position.

The fan 145 of blower system 142 can be operated to discharge in either an upward or a downward direction. As illustrated in FIG. 5, cryogen is injected into the freezer enclosure by lines 124, herein representing spray nozzles for direct impingement of cryogen vapor on the product to be cooled or frozen. Accordingly, the fan 145 is made to discharge in a downward direction. If the spray nozzles are replaced by a cryogen immersion bath, it is preferred that the direction of discharge of fan 145 be reversed, the fan now being made to discharge in an upward direction, to more uniformly distribute cryogen vapor resulting from the immersion bath.

FIG. 6 illustrates the same control system described above with reference to FIG. 4, except that the output of fan control unit 140 is now directed along output conductors 144 through the actuator motor 143, rather than the transition-mounted blowers 141 of the preceding embodiment. As before, a pressure signal derived from the cryogen injection system is fed to the fan control unit 140. In the preferred embodiment, the damper actuator motor 143 is continuously variable and accordingly the fan control unit 140 includes circuitry appropriate to drive the motor 143. For example, in the preferred embodiment, the pressure transducer provides an output signal of 0 to 10 volts DC, and the actuator motor 143 requires pulse input signals ranging between 0 and 115 volts. Accordingly, the fan control unit 140 provides circuitry necessary to perform the signal conversion.

In addition, as in the other embodiments of the present invention, the fan control unit 140 includes a gain control module which can be set by an operator during initialization of the freezer operation to provide a convenient initial set point of the cryogen vapor discharge through the freezer entrance opening 112.

Figure 7:
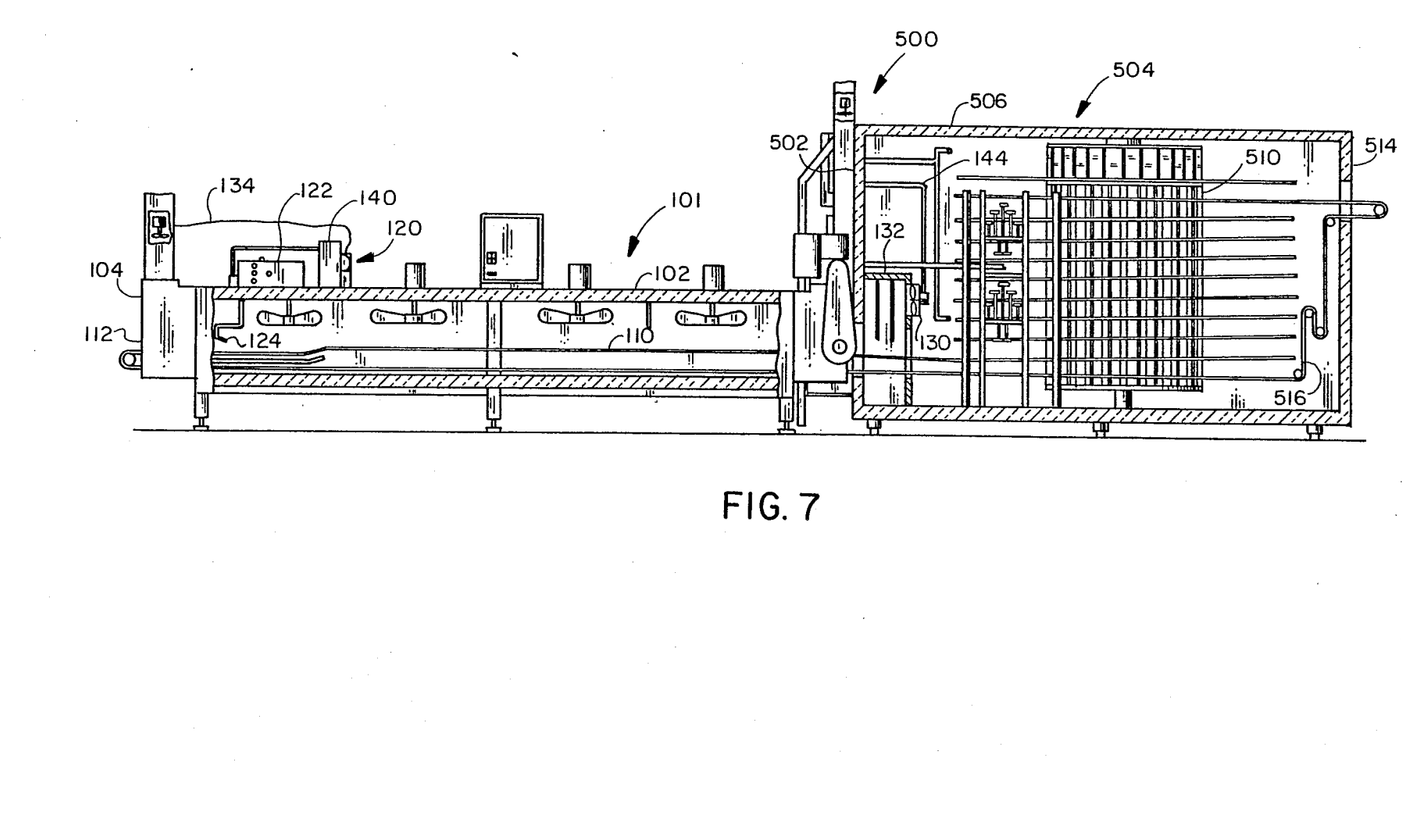
FIG. 7 is a perspective view of a liquid cryogen freezer tunnel with automatic vapor balance control according to principles of the present invention, located at the entrance end of a mechanically cooled spiral freezer to provide additional cooling capacity therefor.

Referring now to FIG. 7, one commercially important application of the tunnel freezer of FIGS. 4-6 is to provide added cooling capacity for a mechanical freezer, one using ammonia or FREON, as the cooling medium, for example. FIG. 7 shows a cooling apparatus generally indicated at 500. It is preferred for such combination systems, that the freezer 102 be provided without a vapor balance control blower, such as the blowers 141 of FIG. 4 or the blower system 142 of FIGS. 5-6. The tunnel freezer apparatus 102 is otherwise substantially identical to the tunnel freezers described above with reference either to FIG. 4 or FIGS. 5-6.

The blowers necessary to obtain the desired vapor balance conditions, not only at the entrance 112 to the tunnel freezer but also the exit 514 of the mechanical freezer 504, are provided in a baffle chamber 132 installed in freezer enclosure 506, immediately behind entrance wall 502. Blower fans 130 in chamber 132 provide vapor balance control similar to that described above, responding to fan control signals on conductors 144, outputted by fan control unit 140.

The exit end 106 of freezer apparatus 100 is directly coupled to the entrance end 502 of a mechanical freezer apparatus generally indicated at 504, having an enclosure 506 enclosing a helical stack portion 510 traversed by conveyor belt 110. Products to be cooled or frozen by apparatus 500 are placed on conveyor 110 at entrance 112. The products are then processed by tunnel freezer apparatus 102, passing through the exit of apparatus 102 into enclosure 506. Thereafter, the products enter helical stack 510 and advance to an exit 514. The conveyor belt then passes return loop 516 and reverses direction, travelling toward entrance end 502 of enclosure 506. The conveyor belt thereafter travels toward the entrance end 104 of tunnel enclosure 102, completing the cycle of travel. The tunnel freezer 102 functions as described above with reference to FIGS. 4-6.

Apparatus 500 has an additional advantage in that any cryogen vapor passing completely through tunnel apparatus 102 now enters the mechanically cooled enclosure 506 providing additional cooling therefore. The contribution to overall operating efficiency for apparatus 500 by tunnel freezer 102 and the automatic vapor balance control loop system therein makes the retrofit application of the tunnel freezer economically advantageous.

Control of the blowers 130 follow the same principles described above, particularly those described with reference to the spiral freezer apparatus 10 of FIGS. 1-3. In particular, a gain control module is employed to establish initial vapor outflow conditions during freezer start up. Once the desired freezer operation is established, the gain control module is adjusted to provide the desired amount of cryogen outflow at tunnel freezer entrance 112. If variable speed blowers are employed, the fan control unit 140 generates a continuously varying signal proportional to the pressure signal sensed in the cryogen injection system of the tunnel freezer 102.

The signal driving fan control unit 140 can be obtained from the temperature controller for the tunnel freezer, that control system providing an injection control signal in response to the output of a temperature sensor. It is possible, however, to construct a more economical fan control unit if blower motors having either signal or multiple speed windings are used. In addition to a gain control module, the fan control unit of this latter embodiment would comprise relay devices for switching the windings of the blower motors to obtain different blower output levels. Illustrated in FIG. 7 are a series of auxiliary ceiling-mounted fans to create a turbulent flow surrounding the conveyor belt. The blowers in chamber 132 in effect decrease the pressure of the outflow through freezer entrance 112, and are controlled to closely regulate the cryogen vapor outflow volume through the entrance opening.

As described in the various embodiments above, blower units located within the freezer enclosure are controlled to regulate the cryogen vapor outflow through the freezer enclosure entrance. It will be readily appreciated by those skilled in the art that the principles of the present invention can also be applied to the control of "roof vents," a term describing exhaust vents located adjacent the entrance and/or exit openings of the freezer enclosure. For example, referring again to FIG. 1, a "spill over" chamber 40 is provided to surround the enclosure entrance. An opening 42 in the spill over chamber is aligned in registry with the enclosure entrance opening 24, allowing product to be passed therethrough. Because cryogen vapor is heavier than air, vapor "spilling out" of the entrance opening of the enclosure will fall into chamber 40, being collected there rather than spreading throughout the operating area. A "chimney" 44 evacuates or purges chamber 40. The blowers applying a suction to chimney 44 are commonly referred to as part of the "roof vent" system.

If desired, blowers disposed within the freezer enclosure can be omitted, with vapor balance control according to the present invention being provided by the application of control signals to the blower 45 applying a suction to chimney 44.

The present invention is also directed to control of the blowers providing "roof venting" of tunnel freezers, such as the freezer illustrated in FIG. 4. As shown at the entrance end of FIG. 4, a collection chamber 101 surrounds the entrance end of the freezer and a chimney 103 communicates with chamber 101 to apply a suction thereto. The output of fan control unit 140 can be connected roof vent blower 105 either in combination with or to the exclusion of blowers 141. If blowers 141 are omitted, the output of fan control unit 140 is directed exclusively to roof vent blower 105 to control the cryogen vapor outflow through entrance opening 112. If desired, however, blowers 141 can be used in conjunction with the roof vent blower 105, all being controlled by fan control unit 140. Alternatively, a second fan control unit can be employed, for separate use with the roof vent blower. However, even with two fan control units, a considerable cost savings is still realized, compared to the cost of a process controller. This flexibility is important for example, where a freezer apparatus is operated in a refrigerated environment.

The above are examples of roof vent blower control for a spiral freezer (FIG. 1) and for a tunnel freezer for a combination freezer application (FIG. 4). If desired, however, the vapor balance control of the present invention can also be provided with the other freezer apparatus described herein. In each application, the fan control unit, including a gain control module, will be connected either to the roof vent blower, blowers internal to the freezer enclosure, or both. In addition, those skilled in the art will readily appreciate that roof vents can be provided at any opening of the freezer enclosure, notably the exit openings and that the vapor balance control of the present invention can be employed to provide a controlled vapor balance at any such opening, not only the entrance opening.

It will now be seen that the various vapor balance control systems provided by the present invention receive input signals directly related to cryogen injection, rather than exhaust temperature. For example, input to the vapor balance control is obtained either from the cryogen injection signals of a freezer controller, or pressure signals from sensors monitoring the cryogen injection system. The fan output is thereby made to more directly track the cryogen injection rate, rather than a change in exhaust temperature which lags there behind, sometimes at a considerable time delay interval.

Gain control is provided to set an initial cryogen vapor outflow. However, the cost of such gain control apparatus, like the fan control unit, is not considerable, and does not detract from the economical advantages obtained with the present invention. Further, with the present invention, a fan control unit can comprise relatively inexpensive relay logic if single speed or multiple speed windings are employed in the blower motors. However, even if the blower motors have a continuously variable speed output, the fan control circuitry needed to adapt cryogen injection control signals or pressure sensor signals is still rather inexpensive, especially compared to process controllers such as those that would be required for a temperature-driven control of the freezer blowers.

The drawings and the foregoing descriptions are not intended to represent the only forms of the invention in regard to the detail of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A cryogenic freezer apparatus for food products, comprising:
   a thermally insulated enclosure having an entrance opening and an exit opening;
   conveyor means for conveying products through said enclosure, from said entrance to said exit openings;
   cryogen injecting means in said enclosure, responsive to a cryogen control signal for introducing liquid cryogen in said enclosure, with cryogen vapor being produced thereby;
   blower means in said enclosure to direct cryogen vapor away from said enclosure opening, the output of said blower means being controllable by a blower control signal;
   injection control means coupled to said injecting means, for generating a cryogen control signal;
   blower control means coupled to said blower means to control the output thereof in response to a blower control signal; and
   coupling means coupled to said cryogen control signal and to said blower control means for providing a blower control signal responsive to said cryogen control signal, so that output of the blower means is increased with increasing cryogen injection to limit the outflow of cryogen vapor passing through said enclosure opening to a preselected amount needed to prevent intrusion of the ambient environment through the enclosure opening, despite the increasing volume of cryogen vapor generated in said enclosure, and so that output of the blower means is decreased with decreasing cryogen injection to ensure that the preselected cryogen outflow is maintained at said opening to prevent intrusion of the ambient environment therethrough.

2. The apparatus of claim 1 wherein said coupling means comprises a pressure sensing means to sense changes in pressure of said cryogen injection made in response to said cryogen control signal, said pressure sensing means having an output coupled to said blower control means so as to input thereto, signals responsive to said cryogen injection signal.

3. The apparatus of claim 1 wherein said coupling means comprises conductor means coupling said cryogen control signal to said blower control means.

4. The apparatus of claim 1 wherein said sensing means comprises pressure sensing means means for sensing the pressure of liquid cryogen injected at the enclosure opening by said injection means.

5. The apparatus of claim 1 wherein said enclosure comprises an elongated tunnel enclosing said conveyor means and including an intermediate portion between said opening and said exit, said blower means are located between said sensing means and said intermediate portion, and said injecting means is located between said enclosure opening and said sensing means.

6. The apparatus of claim 5 further comprising means at the tunnel exit for connection to another downstream, freezer apparatus.

7. The apparatus of claim 1 wherein said blower control means includes a gain control mean for initial adjustment of said blower means to produce a preselected cryogen outflow out of said opening, said blower control means thereafter automatically responding to said cryogen control signal.

8. The apparatus of claim wherein the blower control means comprises relay logic for switching control of said blower means.

9. The apparatus of claim 1 wherein said blower means comprises a blower fan surrounded by upstream and downstream selectably operable damper plates, and means for moving said damper plates in response to said blower control signal to selectably direct cryogen vapor in different directions within said enclosure.

10. A cryogenic freezer apparatus for food products, comprising:
    a thermally insulated enclosure having an entrance opening and an exit opening;
    conveyor means for conveying products through said enclosure, from said entrance to said exit openings;
    cryogen injecting means in said enclosure, responsive to a heat load within said enclosure introducing liquid cryogen in said enclosure at varying pressures, with cryogen vapor being produced thereby;

blower means in said enclosure to direct cryogen vapor away from said enclosure opening, the output of said blower means being controllable by a blower control signal;

injection control means coupled to said injecting means, for generating a cryogen control signal;

blower control means coupled to said blower means to control the output thereof in response to a blower control signal;

pressure sensing means for sensing the pressure of the cryogen being injected in the enclosure through said injection means and for generating a sensor output signal in response thereto, said sensor output signal being indicative of the amount of cryogen vapor being generated in said enclosure; and coupling means coupled to said sensor output signal and to said blower control, so that output of the blower means is increased with increasing cryogen injection to limit the outflow of cryogen vapor passing through said entrance opening to a preselected amount needed to prevent intrusion of the ambient environment through the entrance opening, despite increasing cryogen vapor pressure in said enclosure, and so that output of the blower means is decreased with decreasing cryogen injection to ensure that the preselected cryogen outflow is maintained at said opening to prevent intrusion of the ambient environment therethrough.

11. A cryogenic freezer apparatus for food products, comprising:

a thermally insulated enclosure having upper and lower openings;

conveyor means for conveying products through said enclosure, between said upper and said lower openings;

cryogen injecting means in said enclosure, responsive to a cryogen control signal for introducing liquid cryogen in said enclosure, with cryogen vapor being produced thereby;

blower means in said enclosure to direct cryogen vapor away from said lower enclosure opening, the output of said blower means being controllable by a blower control signal;

injection control means coupled to said injecting means, for generating a cryogen control signal;

blower control means coupled to said blower means to control the output thereof in response to a blower control signal; and coupling means coupled to said cyrogen control signal and to said blower control means for providing a blower control signal responsive to said cryogen control signal, so that output of the blower means is increased with increasing cryogen injection to limit the outflow of cryogen vapor passing through said enclosure opening to a preselected amount needed to prevent intrusion of the ambient environment through the enclosure opening, despite the increasing volume of cryogen vapor generated in said enclosure, and so that output of the blower means is decreased with decreasing cryogen injection to ensure that the preselected cryogen outflow is maintained at said opening to prevent intrusion of the ambient environment therethrough.

12. A cryogenic freezer apparatus for food products, comprising:

a thermally insulated enclosure having an entrance opening and an exit opening;

conveyor means for conveying products through said enclosure, from said entrance to said exit openings;

cryogen injecting means in said enclosure, responsive to a cryogen control signal for introducing liquid cryogen in said enclosure, with cryogen vapor being produced adjacent one said opening;

blower means in said enclosure to direct cryogen vapor away from the other of said enclosure openings, the output of said blower means being controllable by a blower control signal;

injection control means coupled to said injecting means, for generating a cryogen control signal;

blower control means coupled to said blower means to control the output thereof in response to a blower control signal; and coupling means coupled to said cyrogen control signal and to said blower control means for providing a blower control signal responsive to said cryogen control signal, so that output of the blower means is increased with increasing cryogen injection to limit the outflow of cryogen vapor passing through said enclosure opening to a preselected amount needed to prevent intrusion of the ambient environment through the enclosure opening, despite the increasing volume of cryogen vapor generated in said enclosure, and so that output of the blower means is decreased with decreasing cryogen injection to ensure that the preselected cryogen outflow is maintained at said opening to prevent intrusion of the ambient environment therethrough.

* * * * *